United States Patent [19]

Welch

[11] Patent Number: 5,230,061
[45] Date of Patent: Jul. 20, 1993

[54] CLAUSE COUNTER MAP INFERENCE ENGINE

[75] Inventor: John T. Welch, Akron, Ohio

[73] Assignee: The University of Akron, Akron, Ohio

[21] Appl. No.: 815,968

[22] Filed: Jan. 2, 1992

[51] Int. Cl.$^5$ ................................................ G06F 9/00
[52] U.S. Cl. ........................................ 395/51; 395/61; 395/903; 395/904; 395/906; 364/148
[58] Field of Search ................... 395/51, 61, 903, 904, 395/906; 364/148

[56] References Cited

U.S. PATENT DOCUMENTS

| | | | |
|---|---|---|---|
| 4,918,620 | 4/1990 | Ulug | 395/61 |
| 5,051,923 | 9/1991 | Tsukagoshi | 395/51 |
| 5,119,318 | 6/1992 | Paradies et al. | 395/61 |

OTHER PUBLICATIONS

Holt et al, "Fundamentals of Structured Programming Using Fortran with SF/k and WATFIV-S", Reston Publishing, 1977, pp. 59, 177.

Primary Examiner—Allen R. MacDonald
Attorney, Agent, or Firm—Oldham, Oldham, & Wilson Co.

[57] ABSTRACT

The invention describes a clause counter map inference engine which is an interpreter method based upon the Boolean form, in which Boolean inference is directly assisted by a programmable data structure. The system provides a translation of a series of Boolean logic functions into a compact map representation, which may then be used for Boolean inference by means of an interpreter algorithm or inference engine adapted to update function values based upon any changed input value. The invention provides a rule-based model for logical control systems having an imbeddable, event-chaining inference engine which is independent of the rule-based model. The time to complete a scan cycle of the system depends directly upon the number of inferences in an up-date interval between input and output variable changes, and the lengths of inference chains of events in the logic. The clause counter map inference engine generally provides a method of implementing logical functions where inferencing is at an optimum, thereby reducing inference processing time and providing a system which may take the place of other on-line control methods for implementation of a PLC, and also may be applied to expert and knowledge-based decision systems which utilize logic programming and rule search methods.

8 Claims, 4 Drawing Sheets

CLAUSE COUNTER MAP INFERENCE ENGINE

FIELD OF THE INVENTION

The present invention relates to a clause counter map inference engine which generally provides a method of implementing logical functions with inferencing in interpretation being at an optimum to reduce inference processing time and provide a highly efficient means of carrying out both 3-valued and ordinary 2-valued Boolean inference. More particularly, the invention provides a method of implementing logical functions and provides a translation of a system of Boolean functions into a map representation, which may then be used for inference by means of an interpreter algorithm.

BACKGROUND OF THE INVENTION

In discrete logic systems, such as programmable logic controller (PLC) systems as well as artificial intelligence computing systems, logic control systems are normally utilized in the implementation and operation of such systems. PLC's are typically connected to industrial equipment such as in assembly lines and machine tools for operation of the equipment according to a stored control program. A PLC implements a user defined logic model by software, which provides programmability and therefore flexibility to allow customization of the control system to a particular situation and to allow modification and reinstallation easily and effectively. For this reason, the PLC is an integral component in the manufacturing support industry, and provides for the development and installation of logic control components in automated systems of all kinds. As the need for flexibility in the manufacturing process grows, the need for a flexible and highly efficient logic controller also grows. One limitation of current PLC design lies in the speed of operation, and it should be recognized that speed improvements in PLC on-line control would have significant influence upon the scope of the applications of PLCs in manufacturing and end-user products.

Programmable logic controller (PLC) systems employ general purpose computer processors to implement logical control schemes in a flexible manner. In general, a PLC system consists of a development system for entry in and simulation of a control scheme or design model, and a control interpreter, which executes the control scheme. The development system is used to produce the control scheme in a model design language familiar to the user. This representation is then translated into a more compact and efficient form and is loaded into memory for the interpreter. Many prior art PLC systems translate the design model into a machine language control program which is executed, or a similarly low level control program language which is interpreted. The programmable control scheme allows the user to customize the control system to a particular situation as needed. PLC's implement hardware sequential machines in software, essentially performing by processor instructions what would be done in parallel by propagation of electrical signals in hardware. Although small scale hardware sequential machines can be optimally designed, PLC systems routinely handle a number of inputs and states which preclude such treatment. Additionally, PLC systems are designed for use by personnel who are not familiar with discrete logic or principles of digital hardware design, and therefore rely upon high level design languages for human interface.

An on-line control function is implemented by interpretation or translation of the design language into lower level, procedural languages which are executed by a processor. The primary function of accepted design languages is the graphic portrayal of the state of the logic model used in the on-line control function. Popular design languages for PLC systems include the relay ladder logic diagram, the function chart, and the Petri net. The features of the design language for representing and handling the state of the design model visually are distinct from the on-line control function or real time operation of a logic controller integrated with a particular application.

Most PLC systems are based upon the relay ladder diagram, which provides a simplified model of the physical relay panels formerly being the primary means of implementation of logical control rules. Relay ladder diagram development supports simple, dedicated input entry keyboards and provides easily interpreted displays of control and output states. PLC systems of the prior art, in which the on-line control model is a representation of the ladder diagram or its equivalent in logical functions, have required a scan over the entire model for each cycle of advance of transient events through the model. The scan time in such systems has therefore been proportional to the size of the control model.

Alternatively, development systems based upon finite state machines, such as the Grafcet model, have been created. Grafcet represents either a single Moore finite state machine, or the coordinated operation of such machines to implement a parallel control scheme. The visual representation of the structure and behavior of these systems is known as a function chart. In addition, the Petri net model, which function chart systems are sometimes referred to as, provide a general model which has been used in specification and analysis techniques with limited use as an implementation device. In the present invention, any of these design languages may be realized on-line by translation of the design language descriptions into the clause counter map representation as will be hereinafter described. Alternatively, distinct from design language descriptions, there have been developed state based on-line realizations which avoid processing the whole model on every cycle, but do require polling of the transition logic of active states. An example of a state based implementation is shown in U.S. Pat. No. 4,562,529.

There is various patent literature related generally to PLC design, such as for example, U.S. Pat. No. 4,021,783, wherein a programmable controller utilizes a microcontroller and an associated instruction set for implementation of ladder logic. After a relay ladder diagram has been translated into a control program, the microcontroller will repeatedly execute this program to scan. In this way, the PLC operates on-line by scanning the control program. This patent also suggests a double-buffered input system which records events in isolation from ladder scan in the "synchronous mode" and input events can be allowed to effect contacts during scan in an "asynchronous mode". In U.S. Pat. No. 4,165,534 there is shown a digital control system with Boolean processor, wherein the digital control architecture has a standard 8-bit microprocessor, a 1-bit Boolean coprocessor and an 8-bit I/O control interface system. The control program indicates the use of the Boolean form in the logic controller. In U.S. Pat. No. 4,172,289, an I/O feature of the above described system is provided wherein the control language includes instructions which immediately interrogate the current value of a selected input and immediately transmit a selected output. Repetition of the calculation in the control language program for a scan allows multiple interrogations and transmissions for higher frequency control variables. This ability addresses one disadvantage of a system which performs synchronous scan of a control program.

In U.S. Pat. No. 4,914,567, there is shown a design system using visual language which is a PLC design environment for logical asynchronous control based specifically on Grafcet. The system combines high level design and low level implementation facilities. No specific on-line control method is discussed, and it is suggested that the low-level logic specification language for setting and testing state variables may be any commonly used high-level language, but is not specified as an inference mechanism.

It is also found that the use of logical control systems extends to the implementation of artificial intelligence computing systems. In artificial intelligence computing technology, real time control tools may be a necessity. Artificial intelligence and real time control systems share a requirement for efficient deduction systems as embedded modules. In artificial intelligence systems, the concept of a shell system which supports quickly programmed and extended applications has been developed. The incremental, shell-supported development style of rule-based expert system shells is an attractive development mode for real time logical control modules. In the PLC systems mentioned above, the partial control system counterparts to artificial intelligence shells have been developed, but imbeddable logical control interpreters based upon such control systems generally do not offer sufficient performance for real time applications. It should therefore by evident that a logic control system having significant speed improvements may be applicable for real time control and utilized in possible applications for intelligent control.

There are also known knowledge based systems, such as in U.S. Pat. No. 4,754,409, which shows a method of invoking a resident program to answer questions generated in backward chaining questioning in a control program. In U.S. Pat. No. 4,763,277, there is shown a method of determining when a question has been answered in backward chaining of the control algorithm. In these knowledge based systems as well as the PLC applications, a primary functional specification of an on-line algorithm is to generate correct output events corresponding to input events. In rule-based production systems, this function of generating an output event corresponding to input events is known as forward or backward chaining. On-line implementation in such systems also generally involves a large amount of software polling, wherein repeated testing of failed conditions in the control system are performed.

There has also been discussed a graph method associated with inference engines in expert systems as desired in the article entitled "Forward-Chaining versus A Graph Approach As The Inference Engine in Expert Systems" by Richard E. Neapolitan, in PROC. APPLICATIONS OF ARTIFICIAL INTELLIGENCE III, SPIE Volume 635, pages 62-69, April 1986. In this method, the rules of a rule-based expert system are stored in a graph in which each rule is represented by a special count node. This approach envisions a tree of rules, with counters representing the clause states. This approach is limited in that the rule network is strictly a tree, and each fact and rule can belong to any one clause. Additionally, no provision has been set forth for complimented(NOT) clause numbers and clause values are determined by comparing the count with a total number of members in the system which is more time consuming. Three-valued Boolean logic is also not able to be represented in the graph approach. Additionally, only AND clauses are represented in the graph approach, and other clause forms are not envisioned.

In the prior art, implementation by scanning of a logic control system essentially precludes real time operation using such techniques, and requirements of polling can render an on-line implementation scheme unusable for more demanding PLC or similar applications. Other deficiencies are found in that inferencing cannot be carried out in an optimum manner other than on a case-by-case basis, and limits to the flexibility of existing systems are present.

SUMMARY OF THE INVENTION

Based upon the foregoing, there has been found a need to provide an improved method of implementing logical control schemes in a highly efficient and flexible manner. The present invention poses a clause counter map method which is a rule-based inference method for discrete logic systems, and which eliminates software polling. The present invention therefore offers an efficient realization of a family of extended sequential machines using two and three-valued Boolean logic functions. The methods of the invention therefore are applicable to programmable logic controllers in industrial control or other uses, and to the logic inference engines of knowledge-based information systems. A main object of the invention is therefore to provide an inference method for discrete logic systems which significantly reduces processing time and therefore provides an on-line control method which is an optimally time-efficient realization of an extended canonical form of synchronous sequential machine.

It is another aspect of the invention to provide an on-line system which operates in real time and therefore is usable in knowledge-based information systems and other real time applications.

Another object of the invention is to provide an on-line rule based inferencing method for programmable logic systems which eliminates software polling, or the repeated testing of failed conditions for actions, without taking action, being a non-functional specification for more demanding PLC applications.

Another object of the invention is to provide a clause counter map inference engine to implement logical functions, wherein inferencing is optimized.

Yet another object of the invention is to provide a clause counter map inference engine for implementation of logical functions wherein inference processing time depends only upon the extent of the implication of input, and is not affected by the size of the system of functions. Such implementation may be referred to as "event chaining", wherein updating of state and output variables of a control system are carried out in a time proportional to the number of input events and resulting state transient events.

Still another object of the invention is to provide a clause counter map inference engine for implementation of logical functions wherein the representation of the control scheme is flexible, and current popular representations of control logic are readily translated into functions of the type necessary for use in the control scheme.

The clause counter map inference engine of the invention is an interpreter method based upon the Boolean form, in which Boolean inference is directly assisted by a programmable data structure. The system provides a translation of a series of Boolean logic functions into a compact map representation, which may then be used for Boolean inference by means of an interpreter algorithm or inference engine adapted to update function values based upon any changed input value. By maintaining full truth status of clauses within the logic, the method confines scan processing to the portions of the logic which change, such that there is no control language program to be traversed, and no scan time dependence on the size of the control model. The clause counter map inference engine generally provides a method of implementing logical functions where inferencing is at an optimum, thereby reducing inference processing time and providing a system which may be used in real time control applications. In artificial intelligence computing technology, such a real time control system is particularly advantageous, and the method also would allow PLC systems to return to the inherently flexible software interpreter mode of implementation, wherein one standard microprocessor may be used to combine logic implementation with other tasks of the control environment.

The clause counter map inference engine of the invention provides a rule-based model for logical control systems having an imbeddable, event-chaining inference engine which is independent of the rule-based model. The time to complete a scan cycle of the system depends directly upon the number of inferences in an up-date interval between input and output variable changes, and the lengths of inference chains of events in the logic. The system offers efficiency in the execution of logical control schemes on general purpose computers and can be universally used for interpreters of PLC systems in that it allows all design model representations of logical control schemes to be reduced to equivalent systems of Boolean equations fitting into the rule-based model. The method may take the place of other on-line control methods for implementation of a PLC, and also may be applied to expert and knowledge-based decision systems which utilize logic programming and rule search methods.

BRIEF DESCRIPTION OF THE DRAWINGS

These and other objects and advantages of the invention will become apparent upon a further reading of the Detailed Description in conjunction with the drawings wherein.

DETAILED DESCRIPTION OF THE INVENTION

Figure 1:
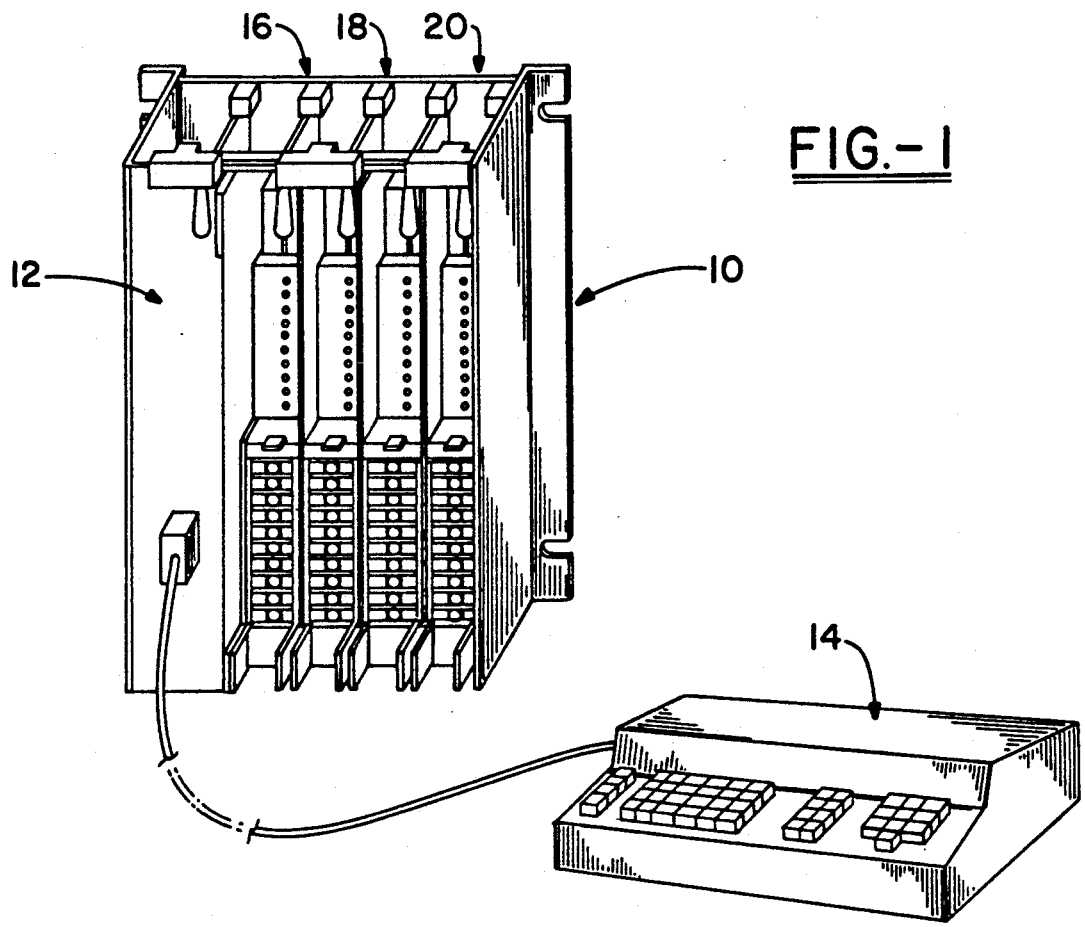
FIG. 1 is a perspective view of the components generally comprising a programmable controller utilizing the present invention.

The invention will be described with reference to a first preferred embodiment thereof, wherein the clause counter map inference engine forms a component of a programmable logic controller system, wherein as seen in FIG. 1, a programmable controller 10 will generally comprise a plurality of modules, being IC circuit boards adapted to perform a variety of functions in the control system. The PLC system 10 will generally include a processor module 12, into which a keyboard 14 may be selectively coupled for programming or editing of a control program into the PLC 10. A plurality of input/output modules 16, 18 and 20 may be coupled to the processing module 12 by means of input and output ports on module 12 to provide the desired processing characteristics for a control system adapted to perform preselected functions. The input/output modules 16, 18 and 20 may include digital or analog I/O modules which may be isolated, high density modules or standard configuration I/O modules. The particular requirements for a control system utilizing the PLC 10 will vary according to the particular need of an application. The connections between modules in the PLC 10 are accomplished through a hard-wired backplane, and sensing devices will be coupled to one or more of the I/O modules 16, 18 or 20 along with coupling of machine components which are to be controlled by means of the PLC system 10.

The processing module 12 of the PLC system 10 includes an on-board RAM in which is stored a data model and inference engine or control interpreter adapted to control various functions of a machine or other systems to be controlled. The control inference is a model independent inference engine adapted to execute the data model, and connection to machine components is made through the I/O interface modules 16, 18 and 20. Machine functions and the status of sensing devices for example may be received by the processing module 12 through the I/O modules 16, 18 and 20. The control interference will implement and control machine functions based upon the status of such inputs. Similarly, the control program and processing module will generate output signals coupled through one or more of the I/O modules for controlling operating devices on a machine such as motor starters, solenoids and the like. It should be recognized that by means of the control model stored in the processing module 12, the PLC system 10 may be utilized to effectively control a broad variety of machine functions in a broad variety of applications. The control model stored in the on-board RAM of the processing module 12 may be input and edited by means of a program panel 14 or keyboard to allow a great amount of flexibility in the implementation of the PLC 10.

Figure 2:
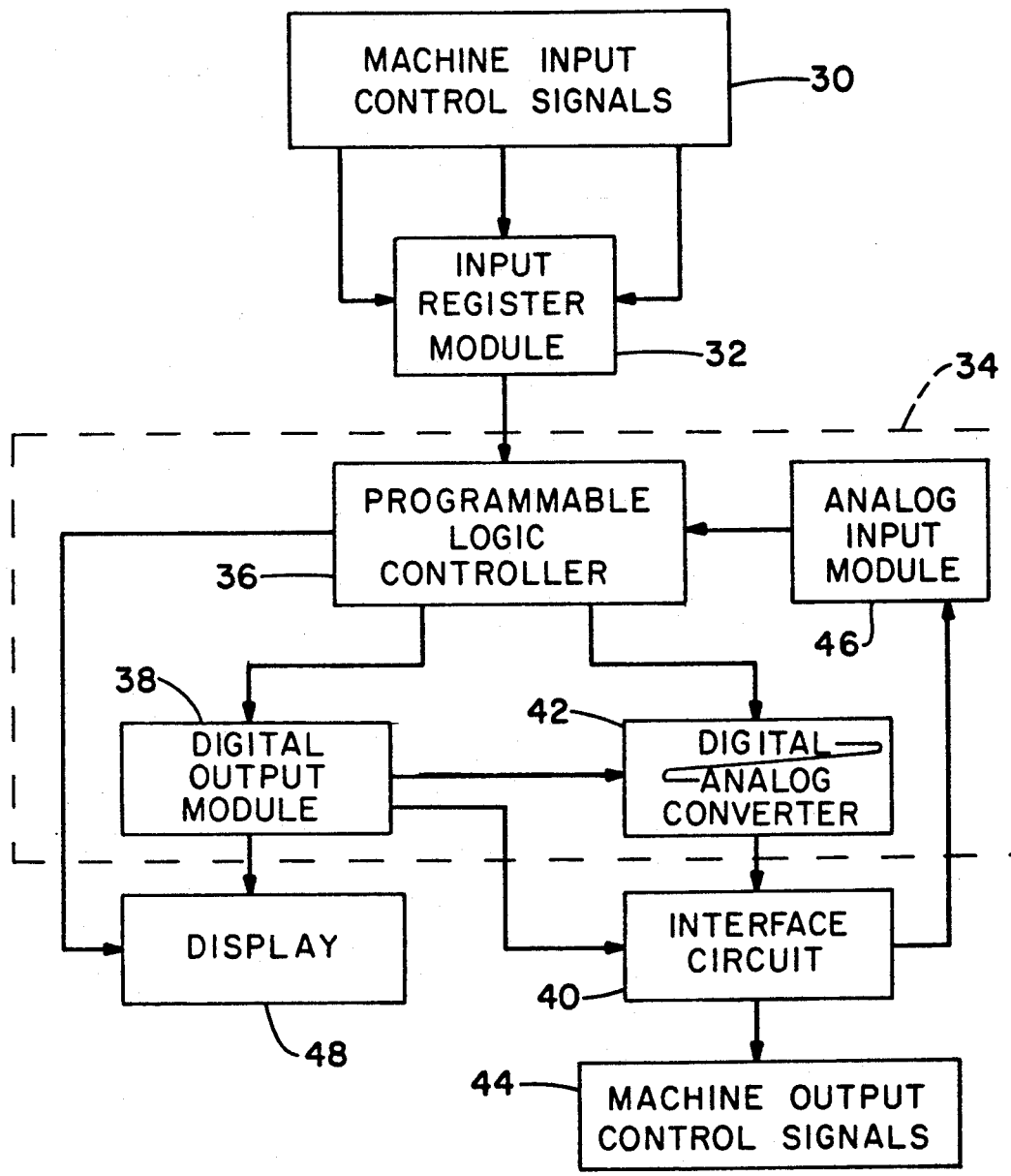
FIG. 2 is a generally schematic block diagram indicating the components of the programmable logic controller system and the relationship to one another for the control of an external machine or operation.

Turning to FIG. 2, there is generally depicted a PLC control system, wherein machine input control signals 30 from various sensing devices or the like are directed to an input register model 32 and then to a processing module of a control circuit 34 including a PLC 36. The PLC 36 including a processing module associated therewith is coupled to a digital output module 38 which is adapted to supply digital output control signals either directly to an interface circuit 40 or through a D/A converter 42 to the interface circuit 40. The interface circuit 40 thus provides machine output signals 44 for control of various machine functions as previously described. The interface circuit may also couple feedback signals from various machine sensing devices or the like which are supplied to the PLC 36 through an analogue input module 46. Various status and machine function conditions may be displayed on a suitable display device 48 as desired.

Figure 3:
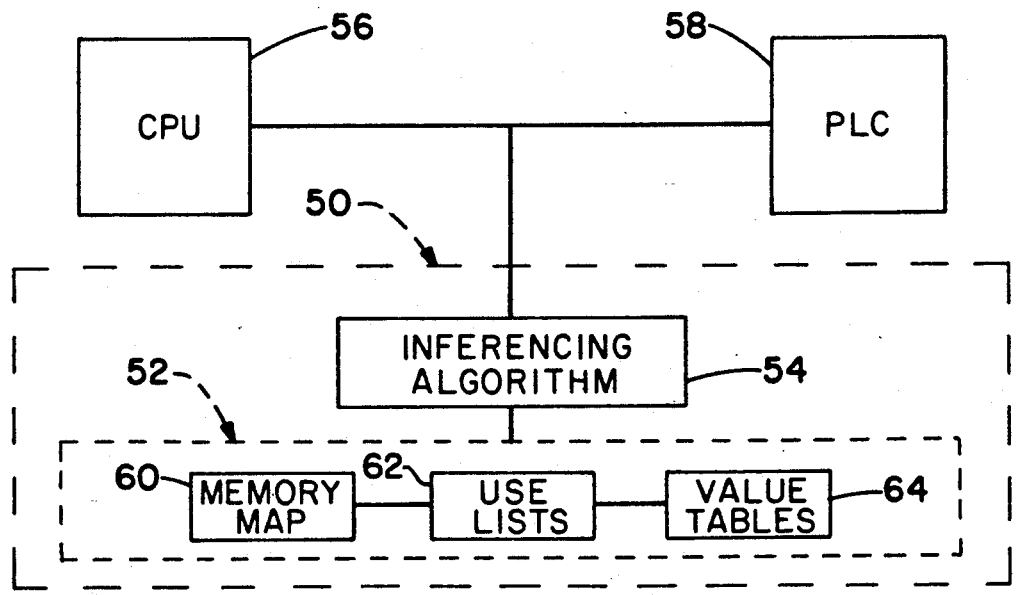
FIG. 3 is a generally schematic block diagram of a programmable logic controller system incorporating the present invention.

In a programmable logic controller system as described with reference to FIG. 2, the clause counter map inference engine of the present invention allows implementation of a control model by optimizing the implementation of logical functions in the execution of the control inferencing. With reference to FIG. 3, the clause counter map inference engine generally designated 50 includes a clause counter map 52 and an interpreter algorithm 54. The clause counter map inference engine 50 is coupled to the processing circuitry or CPU 56 associated with a programmable logic controller circuit 58 in a PLC system. The clause counter map 52 comprises three parts in the preferred embodiment, including a memory map 60, a set of use lists 62 and value table 64. In this configuration, the memory map 60 comprises direct maps of ordinary 2-valued as well as 3-valued Boolean functions in computer memory. The memory map 60 essentially comprises a data structure being a map of the structure of a series of rules in which the state of each rule is maintained. The map generated is an array representing the nesting relationships and the truth status of a series of variables joined by the same logical connective, being referred to as a clause. For mapping, the functions are expressed as nested clauses, wherein the memory map will contain all of the structural information about the functions, and will also record the current state of the clauses within the map. Also provided in association with memory map 60 is the set of use lists 62, wherein for each input and function, a use list describes where the value is used as an input to other functions of the system. Each member of a use list is an address or offset location within the memory map 60 such that each use list gives the map addresses of clauses in which the corresponding input or state variable is used. The use of an item in a clause, or the use of its compliment(NOT) is included in the use list entries achieve desired results in updating clauses upon processing of portions of the logic within the memory map 60. The value table 64 of the clause counter map 52 provides a table of values for each input and function of the system.

Although a look up procedure is performed using a value table 64, other methods by which the effects of input variable changes on functions within the clause counter map 52 map be used. For Boolean inferencing, each variable and function of the system may have three values permitted which may be designated YES, NO and UNKNOWN. The value YES corresponds to the "true" value of Boolean algebra, and the value NO corresponds to the "false" value of Boolean algebra. Due to the three possible states of values in the system, each value will require two bits of memory for storage, and the value array may be implemented by any convenient method. For example, in implementation of the clause counter map inference engine 50, unique index numbers will be assigned to each input and function in the memory map by any convenient number. The index numbers will then provide access to the use list 62 and value table 64 for inferencing. The clause counter map 52 comprising memory map 60, use list 62 and value table 64 provides a static data structure defining the makeup of rules and clauses, which are interfaced with the dynamic portion of the inference engine 50 being the interpreter algorithm 54 which is designed to record the current truth status of each clause in the clause counter map.

Figure 4:
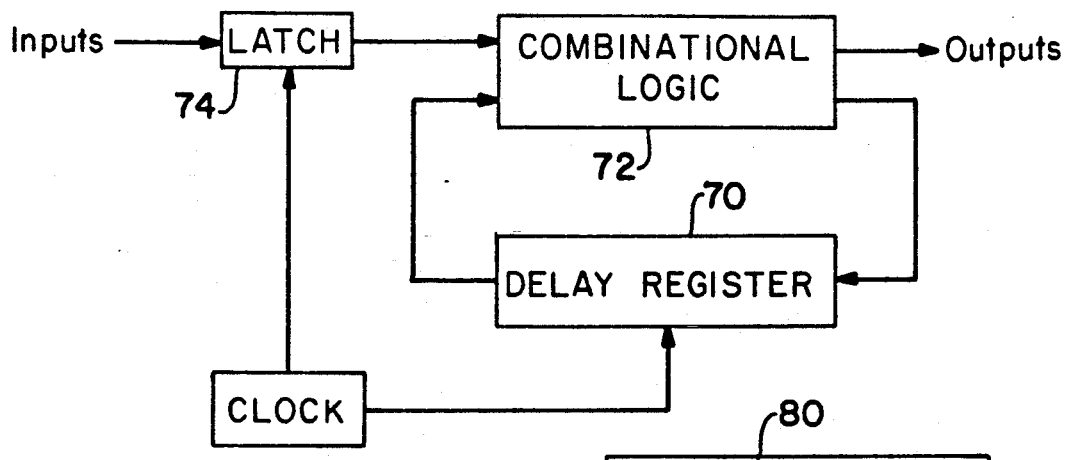
FIG. 4 is a generally schematic diagram of a canonical form of a synchronous machine for which the present invention may be utilized.

The configuration of the clause counter map inference engine for on-line control will be described in more detail as the description proceeds, but it is first mentioned that the universality of the invention for on-line control stems from the fundamental nature of the canonical form of a synchronous machine circuit as seen in FIG. 4. In the synchronous circuit, all memory resides in the register of master-slave delay flip flops 70, which are coupled to the clock of the system. Upon each clock signal, the delay register 70 is adapted to capture the output of a combinational circuit 72, and in turn presents the previous cycles Boolean state variables to the combinational circuit 72, along with any changed input variables by means of latch 74. In each cycle, the outputs of the combinational logic circuit 72 are the logical combinations of state variables of the delay register 70 along with the inputs coupled through latch 74. The synchronous sequential machine will be expressed in this manner regardless of the design language definition used in the combinational logic circuit 72, and may be detailed into one of two equivalent forms. A first form is the Moore machine, in which outputs are a function solely of the state variables, with a second form being the Mealy machine where outputs are dependent upon inputs. It should also be recognized that by eliminating the clocked control signals to delay register 70 and latch 74, an asynchronous machine would be formed. An asynchronous circuit is normally employed only where absolutely necessary in digital systems, as greater design difficulty arises in the use of such asynchronous machines. Therefore, the synchronous machine is normally utilized for the software emulation necessary and inherent in PLC systems for example.

Using a PLC as an example, the primary functional specification of an on-line control algorithm will generate correct outputs from the combinational logic circuit 72 based upon corresponding input events latched to logic circuit 72 by means of latch 74. In rule-based production systems, this function is known as "forward chaining". Generally, on-line implementation in PLC systems will involve a large amount of software polling or the repeated testing of failed conditions for actions, without taking action in the control system. The "forward chaining" approach in an on-line control algorithm requiring polling in its operating will therefore be less efficient and present a limitation to use of the control system. The clause counter map inference engine of the invention provides poll free operation, wherein implementation of the on-line control algorithm will eliminate the need for software polling. Poll free operation is important for the more demanding PLC applications as well as expert systems and logic inference engines of knowledge-based information systems. Such poll free operation is attained in the present invention by employing a methodology referred to as "event chaining". In the event chaining technique, changes in variable values are the "events" upon which mechanisms may be implemented to cause an event to trigger its consequent events without testing of other values. In event chaining, the testing which would otherwise be required to decide how to service an event has already been performed when the event occurs, and therefore its results are available to the interpreter algorithm as it responds to the event. The on-line system of the clause counter map of the inference engine of the invention, which includes the static portion comprising memory map, use lists and value tables, goes far beyond the model states of the delay register 70 in the canonical form of the synchronous machine shown in FIG. 4. Thus, within the clause counter map of the invention, the exact states of individual gates of the combinational logic circuit 72 may be represented as the clauses of the clause counter map to be hereinafter defined.

The present invention provides an event chaining on-line method, which for example is in contrast to many current PLC designs which operate on-line using scanning techniques. In such scanning techniques, only model state variable values are retained in memory, rather than exact states of individual gates in the combinational logic. For this reason, the scanning operation requires the entire model, or a selected part of it, to be traversed or scanned on each emulated synchronous machine cycle. Under such on-line operation, model scanning time determines the minimum clock cycle governing the latching of inputs in the updating procedure of outputs, and presents a significant limitation to implementation of a control system. Alternatively, the confinement of model scanning to transition logic event chaining is not fully achieved and polling of the state and logic is required.

The clause counter map inference engine of the invention departs from such scanning operations, and emulates a free running synchronous machine whose "clock" advances as soon as one cycle of transient response to recent events has been computed. Thus, only the combinational logic "gates" directly involved in the propagation of unexpired transients for one synchronous cycle are processed. New event transients can be started while the resolution of the transients of previous events are in progress, without "race" ambiguities arising. The result of the event chaining on-line method of the invention is an easily understood, accurate and minimally delayed approximation of model behavior, implicitly synchronized to preclude signal races which would occur in corresponding asynchronous machines wherein clock control signals have been eliminated.

The clause counter map inference engine of the invention provides a method to implement a set of logical rules. As mentioned previously, the clause counter map represents a series of rules, wherein a rule begins with an identifying index along with a rule type, and continues with a rule type code and at least one main clause. Any following clauses may be separated by a skip marker, or alternatively if no skip marker separates clauses, the clause is held to be a member of the clause it follows. Clauses separated by a skip marker are members of the same parent clause, and may be termed sibling clauses. In the preferred form, three types of rules exist, each being marked by a distinct code. Each clause has a "counts" field and a connective code, wherein the first clause is marked by a distinct set of connective codes. The counts field of the clause may consist of two counts for a three-valued operator, or one count for two-valued operators. Generally, the clause counter map will utilize two or three-valued operators consistently with the map. Logical connectives within the map are represented by distinct codes, which are distinct from a skip marker code, and main clause connective codes are distinct from other clause connectives as well as the skip marker code. The order of rules within the map is not material, as the use list will determine the location within the map at which processing begins. Additionally, rule and clause parts may be reversed if desired with processing achieved in the reverse manner. The formal description of the memory map representations and contents are summarized in Table 1 as follows:

TABLE 1

1. clause counter map = Rule {rule}
2. rule = index ruletype main clause {[skip] clause}
3. ruletype = (IFF code | IF code | NOTIF code)
4. clause = counts connective
5. main clause = counts main connective
6. counts = (count notcount | notcount)
7. connective = (AND | OR | NAND | NOR | EXOR
8. main connective = (main AND | main OR | main NAND | main NOR | main EXOR)

In the above table, the following conventions are utilized:
[] enclosed an optional part
{} enclose a part repeated zero or more times
() enclose alternatives
| separates alternatives
= means "is defined as"

The values of the Boolean operators based upon system conditions are shown in Table 2.

TABLE 2

| Operator | Clause Value | Condition |
|---|---|---|
| AND | 'yes' | if all Members are 'yes' |
|  | 'no' | if one or more Members are 'no', |
|  | 'unknown' | otherwise. |
| OR | 'yes' | if one or more Members are 'yes' |
|  | 'no' | if all Members are 'no', |
|  | 'unknown' | otherwise. |
| NAND | 'no' | if all Members are 'yes' |
|  | 'yes' | if one or more Members are 'no', |
|  | 'unknown' | otherwise. |
| NOR | 'no' | if one or more Members are 'yes' |
|  | 'yes' | if all Members are 'no', |
|  | 'unknown' | otherwise. |
| EXOR | 'no' | if no Members are unknown and the number 'yes' is divisible by two. |
|  | 'yes' | if no Members are unknown and the number 'yes' is not divisible by two. |
|  | 'unknown' | otherwise. |

Each logical variable in the clause counter map representation is described by a unique text name, and the logical compliment of a logical variable may appear on the antecedent side of a clause, and may be indicated by a NOT preceding the logical variable. Further, a logical variable may appear as an antecedent and consequent in the clause counter map model, thereby making it a state variable, wherein input variables will only appear as antecedents in clauses, and pure output variables will appear only as consequents. The "Rule Connector" providing a symbol representing a logical implication on the function value has permitted meanings being the three rule connectives IFF, IF and NOTIF. The IFF connective, being the "if and only if" rule corresponds to assignment in which a true antecedent implies a true consequent, and a false antecedent implies a false consequent. Similarly, the IF connective corresponds to assignment in which a true antecedent implies a true consequent, but does not imply that a false antecedent implies a false consequent. In the IF and the NOTIF, a false antecedent will not imply anything, and the function will remain unchanged.

Figure 5:
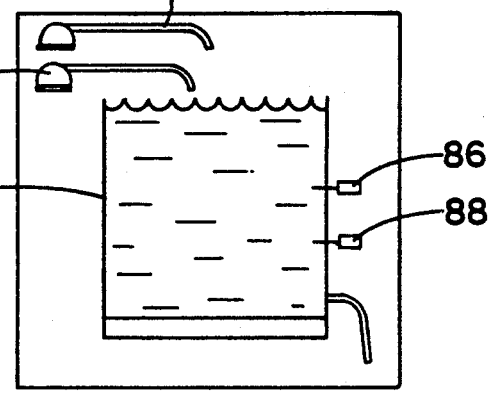
FIG. 5 is schematic view of a twin pump system used as an example for the implementation of a programmable logic control system utilizing the present invention.

As seen in FIG. 5, using the map representations of Table 1, the clause counter map inference engine will be described with reference to an example solution for a simple control problem. The control problem comprises first and second pumps 80 and 82 adapted for filling a reservoir 84. The pumps 80 and 82 are controlled by using two water level sensors 86 and 88, to regulate the level of fluid within reservoir 84. In operation, the control system is to have one pump operating when the fluid level is between sensors 86 and 88, and both pumps operating when the level drops below the lower level sensor 88. Operation of the pumps when fluid level is between sensors 86 and 88 will alternate in the single pump operation as described. The clause counter map inference engine solution for the twin pumps problem may be represented by Table 3 as follows:

TABLE 3

1) between IFF ( AND below1 NOT below2)
2) was IFF between
3) turn1 IF ( OR ( AND was NOT between ) turnon )
4) turn1 NOTIF ( AND was NOT between )
5) was2 IFF below2
6) pump1 IFF ( OR was2 ( AND between turn1 ) )
7) pump2 IFF ( OR was2 (AND between NOT turn1) )

In the clause counter map inference engine model for this problem, the right, antecedent sides represent the inputs and the combinational logic of the canonical synchronous machine of FIG. 4. The variables "between" through "was2" are the state variables corresponding to the delay register 70 of FIG. 4 and "pump1" and "pump2" are the outputs from the combinational logic 72. In this solution, the combination "between" is available from the input level sensors 86 and 88 of FIG. 5 on the next transient cycle of operation. The state "was" is "between" delayed by one cycle, in order to detect the falling edge of "between". The second, third and fourth lines constitute a "divide by 2" sequential machine alternating pump turns as the water level leaves the "between" region in either direction. The lower level sensor 88 represented by the "below2" is delayed by one cycle as "was2" so as to be the same age as "between". This prevents unwanted transients in the output pump control variables, "pump1" and "pump2". As seen in the solution of Table 3, the use of the compliment NOT in the use lists to achieve desired processing of a changed variable is noted.

It may also be useful to provide along with the extended rule connectives IF and NOTIF, a third logical value which may be termed UNKNOWN which is another extension available in the clause counter map inference engine version of the synchronous machine. In the method of the invention, AND clauses containing UNKNOWN terms are evaluated as FALSE if a term is FALSE, and UNKNOWN otherwise. Further, the OR clause containing an UNKNOWN is evaluated as UNKNOWN only if no term is TRUE. The rule connectives in the system also transfer UNKNOWN antecedents to UNKNOWN consequents, thereby making it convenient to allow state values to be UNKNOWN at startup, and to treat input from failed sensors as UNKNOWN, so as to allow appropriate inferences to occur in such circumstances.

As described previously, the clause counter map inference engine provides an off-line translation of a control model to a compact, on-line description or map, which may then be read and updated by an on-line interpreter algorithm. The source description for the translation of the control model may be by any contemporary design language such as a relay ladder diagram, a state or function chart description or a Petri net graph. In addition, such translation may also be by formal text description of the clause counter map model similar to that shown in Table 2. As previously described, the static part of the clause counter map consists of a memory map, use lists and value tables which define the makeup of rules and clauses for a particular control system. The dynamic part or interpreter algorithm of the clause counter map records the current truth status of each clause, such that input events are fed to the on-line interpreter, which then updates the memory map and responds with new values of output variables based upon changed inputs. With respect to the twin pumps problem as described in FIG. 5, a map providing the data structure and corresponding to the solution as outlined in Table 2 is shown in FIG. 6.

With respect to the memory map as described with reference to FIG. 3, and the representations defined in Table 1, this portion of the system comprises a series of rules, laid end to end in computer memory in any order, and corresponds with a set of use lists adapted to give the map addresses of clauses in which the corresponding input or state variable is used. As seen in FIG. 6, bytes are numbered to represent successive map locations in memory, and use lists are represented by threads running through the map. In the memory map, each clause is represented by one or two count values and a logical connective code which was described previously as the "Main Clause" and "Rule Connector". Thus, 2 or 3-valued Boolean functions may be used, with the 3-valued function requiring two counts and the 2-valued function requiring only one count. Within the map, one or more sub-clauses may be nested within a main clause, wherein the sub-clause or sibling clause follows the main or parent clause in which they are contained. The main clause of a rule follows a code for a rule type, which code is preceded by a field giving the unique number associated with the consequent variable, being represented by the name of the consequent variable above the clause in FIG. 6. If two or more sibling clauses are nested within the same parent clause, they may be separated by a "skip" code and off-set such that the interpreter algorithm will be directed to the proper location in the map upon encountering a skip code. As seen in FIG. 6, each input and state variable has a use list represented by the threads running through the map. A use list entry distinguishes the use of the variable from the use of its compliment in the entries host clause, and the use lists and clause adjacency in the map constitute a distribution of information about the contents of clauses. For example, in the first clause of the clause counter map representation of FIG. 6, the use lists comprising the input variables of "below one" and "below two" from the sensors 86 and 88 of FIG. 5 give the map address of the clause in which these input variables are used. Utilizing the memory map and use lists as represented in FIG. 6, a clause counter map model may be generated for implementation of any control system in a desired manner. It should also be recognized that although the map form as depicted in FIG. 6 is one implementation of the control system for the twin pumps problem, an equivalent map form could be obtained by inverting the order of the representation of nested clauses, as the representation of nesting by adjacency of clauses is the essential feature of the rule layout in the map representation.

Figure 6:
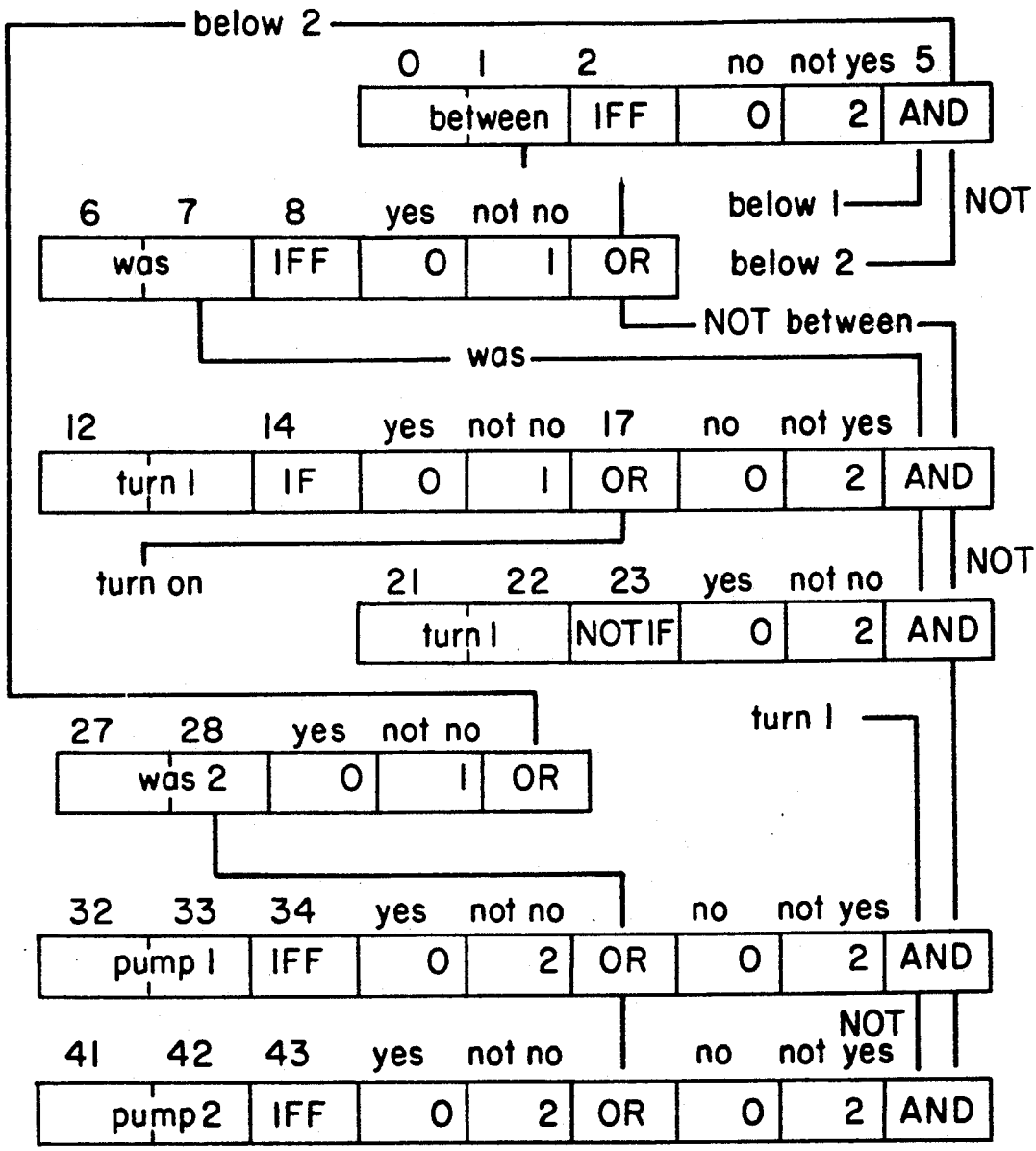
FIG. 6 shows the solution for the twin pump problem of FIG. 5, where an implementation consists of a clause counter map and a set of use lists.

In the clause counter map of the clause structure for the twin pumps problem of FIG. 6, the map follows the order of the logical equations defining the clause counter map solution for this problem as specified in Table 3. As seen in FIG. 6, each box represents a byte of memory, from zero through 49. As previously specified, each AND or OR logical clause is represented by two counts. In the map representation, upon the occurrence of an OR clause, the system remembers how many members are YES and how many are "not no", wherein for AND clauses, the counts reflect how many are "no" and how many are "not yes". The counts associated with AND and OR clauses are chosen to be typically set up in this manner so as to be easy to test whether the clause itself is true or false or unknown. This combination of counts makes testing for the logical values of clauses and matter of testing for zero. The map is also designed such that updates of map representations are reversible. Although two-valued Boolean functions are conventionally used, three-valued Boolean functions may also be implemented, wherein the third value or UNKNOWN value may be beneficial, especially at initial turn-on of a system where all variables in the system may be represented as UNKNOWN so as to be more realistic to an actual situation. When all variables have the value UNKNOWN at system turn-on, the clause counts show the number of members of each clause upon implementation of the control system. As seen in FIG. 6, the logical equations forming the solution for the twin pumps problem are used to generate the map, wherein equation 1 of Table 2 is represented between bytes 0 through 5 of the map. In the event that a feedback signal from lower level sensor 88 indicates that the water level is below this sensor, a use list indicated by the thread running from bytes 5 to bytes 31 will so indicate in the map representation such that the interpreter algorithm of the clause counter map inference engine will be directed to this location in the map for proper implementation of control in the system. Equation 2 of Table 2 is represented in bytes 6-11 wherein the status of the level sensors is indicated to place the level of the water between the sensors or not between the sensors as indicated by the use lists represented as threads from bytes 11. As seen in the map representation, upon an indication that the water level is not between the level sensors, the interpreter algorithm is directed to byte 20 wherein implementation of the control system will act to turn pump 1 on according to equation 3 as specified in bytes 12-20. It is also seen that a use list will direct the interpreter algorithm from byte 20 to byte 7 upon any updating of the status of input variables from the level sensors. As the map representation continues, equation 4 of Table 2 is represented in bytes 21-26, while equation 5 is represented in bytes 27-31 which effect control of pump 1 accordingly. Equations 6 and 7 of Table 2 relate directly to control of pump 1 and pump 2 and are represented in bytes 32 through 40 and 41 through 49 respectively. Although the map representation of FIG. 6 suggests one possible form of the clause counter map useable in the inference engine, other forms are possible, such as providing the map which contains designations of a rule in the map itself rather than in the use list as represented in example of FIG. 6. Similarly, higher level clauses may be organized within the map in a different manner, as nesting by adjacency is the essential feature of the rule layout within the map representation.

Figure 7:
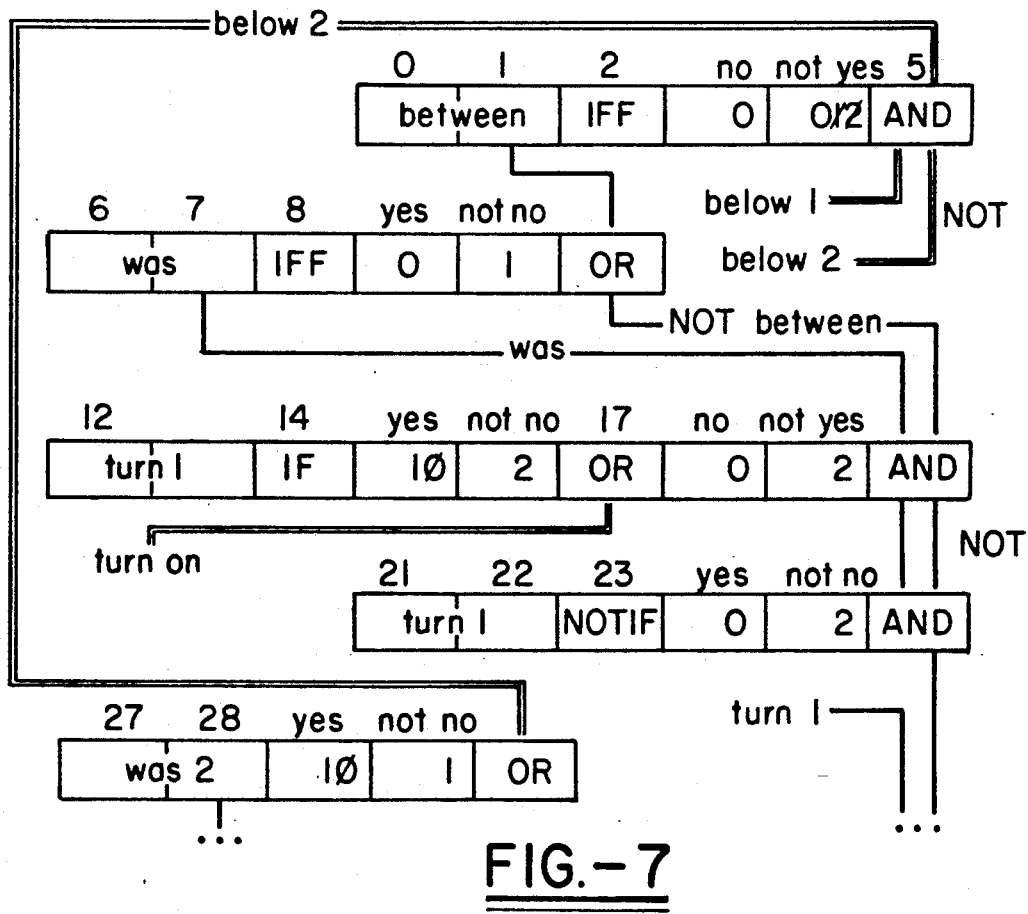
FIG. 7 shows the means by which the present invention updates the counts of a clause in the clause counter map of FIG. 7.

Once the clause counter map has been generated and stored within computer memory, start-up of the dynamic system will induce changes in the map as will be described with reference to FIG. 7. The clause counter map inference engine of the invention requires an inferencing or interpreting algorithm as previously described. Given a change in an input value, the algorithm is adapted to compute the changes in all functions implied by the input variable change. The computation of function changes occurs as an "event driven" process within the clause counter map, wherein by means of the use lists, only an active portion of the map is traversed while function changes are implemented. Also, in carrying out this function, a specific implementation of the algorithm may generate other outputs, such as the number of clause and function changes occurring, or lists of changed function values. The clause counter map on-line interpreter can be implemented as either a continuously running loop or as a consumer process that works to reduce an event queue. The algorithm thus requires either a stack or queue structure, to record in memory function changes not yet processed. The choice between a stack or queue structure depends upon the "order of inferencing" policy of the particular application, and may be arbitrary. In the specific coding, the stack structure may be implicit in the coding by use of recursive procedures. In the queue structure, the inference algorithm processes value changes recorded until the queue has been emptied.

Using the queue structure as an example, each queue entry consists of an input or function index, an old 3-value and a new 3-value Boolean function. Inference processing is initiated by recording the input change in the queue and calling the inference algorithm procedure. For example, to process a queue entry, the interpreter traverses the use list of the variable. From each clause on the use list, the interpreter works its way through clauses toward the rule index field, continuing until a clause value does not change. At each step during this process, an updated clause count field and change code can be obtained by table look up from the value table of the clause counter map. In the twin pumps problem, the event queue for system turn-on would comprise function value changes of the initial UNKNOWN values depending on the level of the water. As seen in FIG. 7, if the queue is not empty, the interpreter will process the event queue, which is the first event on the queue in a first in/first out (FIFO) system of event codes. Each event code identifies a variable, and specifies an old value and a new value of the variable in a change code. If the progression through the clauses reaches a rule type code, then the rule is "fired" by another table look up value from the value tables. Changed rule variable values are posted to the variable immediately, but if the change is to a state variable, its change event is added to the tail of the queue stack. The following Table shows an example of a value table for the AND clause connector, which gives the new count fields and new code, given the current counts and the input "old to new value" code:

TABLE 4

| #no,#notyes | ?-yes | ?-no | no-yes | no-? | yes-no | yes-? |
|---|---|---|---|---|---|---|
| 0,0:yes | n/a | n/a | n/a | n/a | 1,1 | 0,1 |

TABLE 4-continued

| #no,#notyes | ?-yes | ?-no | no-yes | no-? | yes-no | yes-? |
|---|---|---|---|---|---|---|
| 0,1:? | 0,0 ?-yes | 1,1 ?-no | n/a | n/a | yes-no 1,2 ?-no | yes-no 0,2 end |
| 0,2:? | 0,1:? | 1,2:no | n/a | n/a | 1,3:no yes-no | 0,3:? yes-no |
| ... | | | | | | |
| 0,15:? | 0,14 end | 1,15 ?-no | n/a | n/a | n/a | n/a |
| 1,1:no | n/a | n,a | 0,0 no-yes | 0,1 no-? | 2,2 end | 1,2 end |
| 1,2:no | 1,1 end | 2,2 end | 0,1 no-? | 0,2 no-? | 2,3 end | 1,3 end |
| ... | | | | | | |
| 1,15:no | 1,14 end | 2,15 end | 0,14 no-? | 0,15 no-? | n/a | n/a |
| 2,2:no | n/a | n,a | 1,1 end | 1,2 end | 3,3 end | 2,3 end |
| 2,3:no | 2,2 end | 3,3 end | 1,2 end | 1,3 end | 3,4 end | 2,4 end |
| ... | | | | | | |
| 2,15:no | 2,14 end | 3,15 end | 1,14 end | 1,15 end | n/a | n/a |
| 3,3:no | n/a | n,a | 2,2 end | 2,3 end | 4,4 end | 3,4 end |
| ... | | | | | | |
| 14,15:no | 14,14 end | 15,15 end | 13,14 end | 13,15 end | n/a | n/a |
| 15,15:no | n/a | n/a | 14,14 end | 14,15 end | n/a | n/a |

In the above Table 4, the evaluation of the count is included in the left hand column, with the output change code being propagated to the parent clause indicated in the columns to the right of the count evaluation column. The indication of the word "end" in the table suggests that the inference chain ends, as there is no change in the clause value. The separations within Table 4 indicate portions of the table which have been omitted for simplicity, and as indicated the maximum clause size is fifteen items which is typical of implementations as one byte can support two four-bit counts, although changes in the maximum clause size are contemplated. A similar table can be constructed for any type of clause connector to yield a table look up method. Again, other methods besides table lookup may be implemented.

As an example, this process may be traced as the system is turned on in the twin pumps problem previously described, with the water level in the reservoir below the upper sensor but above the lower sensor, or at a point between level sensors 86 and 88 of FIG. 5. The "turn on" events could produce an initial queue wherein the output of upper level sensor 88 or "below1" has a value change of UNKNOWN to NO, while lower level censor "below2" has a changed value of UNKNOWN to YES and the value of "turn on" changes from UNKNOWN to YES. The map changes resulting from the processing of the three initial turn on events are shown in FIG. 7, wherein the first two changed events cause the "between" rule to fire, and the "below2" event change triggers the change of the count in the "was2" rule as indicated at byte 29 of FIG. 7. In looking at FIG. 7, these event changes are reflected as changed count in the map representation of FIG. 6, which are shown more specifically in FIG. 7. For the AND clause connector used in the "between" clause as indicated in byte 5, a change from a NO to YES would require a decrement of both counts of the clause, wherein a change from UNKNOWN to YES does not effect the NO count of the clause. Thus, the change from UNKNOWN to NO in the "below1" variable causes a decrement of the count in byte 4 from 2 to 1. Similarly, a change in the variable "below2" from UNKNOWN to YES will also cause a decrement of the count in byte 4 from 1 to 0 as seen in FIG. 7. Along with the updated count, a table such a Table 4 can provide the corresponding change in clause value. If the value of the clause changes, the inference engine is adapted to scan to the left in the map representation so as to update the clause containing the changed clause, or if none, the inference engine will recalculate the rule as represented by the clause, based upon the updated value of its main clause. If the rule value changes, then the rule variable is added to the queue stack of variables whose use list are to be subsequently processed. It is also seen in the updated map representation of FIG. 7 that the change of the variable "turnon" from UNKNOWN to YES operates on the clause connector OR at byte 17, wherein the count of byte 15 will be incremented from 0 to 1 indicating the new value of the variable. The initial map changes which occur upon system "turnon", with the water level between the level sensors result in these count updates, wherein the processing of the main clause containing these counts will be changed through the IFF rule connector causing the variable "between" to change from UNKNOWN to YES and the variable "turn1" to change from UNKNOWN to YES. As these changes are processed by the interpreter, within the original map representation of FIG. 6, the change of the "turnon" variable is enough to fire the "turn1" rule to initiate operation of the first pump in the system.

After this initial cycle of operation, the event queue of the next cycle will be altered to have the "between" event changed from UNKNOWN to YES, the "was2" event changed from UNKNOWN to NO and the "turn1" event changed from UNKNOWN to YES. Correspondingly, in the next cycle of operation, the "between" event will fire a "was" event, and will combine with the "turn1" count to turn on pump number one. The "pump2" event will fire to a NO value, and the queue will be cleared as all changed rule values have been posted to the variable immediately. Subsequent cycles of operation will not incur any change until the level of fluid within the reservoir is above the upper level censor, whereby a changed value for the "below1" event will be encountered.

Thus, it should be seen that by using the address or offset from the use lists in the clause counter map inference engine, the counts of the located clause may be directly adjusted. This step of adjustment can be done by individual incrementing or decrementing, and testing, in the conventional manner. Faster processing implementations will use the table look up procedure from the value tables similar to that shown in Table 4, in which the old and new values of the changed variable are combined to form and "old to new value" code, which may then be coordinated with the existing count of a clause to look up a new count value and possibly new clause value. If the count adjustment from a cycle does not result in a change in the located clause value, the processing of the change is complete. Alternatively, if the clause value changes, the inference algorithm forms the "old to new" value code for this change, and looks at the next memory location in the direction of the rule connector. If a skip marker is encountered, the next clause representation is skipped, or the algorithm may move directly to the parent clause representation as previously described. When the parent clause representation is encountered, its counts are adjusted, and this process is repeated as long as new clause values are generated. Upon encountering a rule connector, the old value and new value code is coordinated with the rule connector code to look up the required change in the function. If as a result, the function value is changed, the use list of the corresponding function is transcribed into the queue or stack, with the appropriate "old to new value" code added to each queue entry. In some embodiments, the index of the function value will be encountered in the clause counter map after passing a rule connector. The index is used to access the use list for that function value. Alternatively, the function index may be recorded in the use list for a function value, wherein it will then be necessary to copy the index into the queue entry when transcribing the use list therein.

In the clause counter map inference engine, it is only necessary to introduce new input events once per transient cycle of a synchronous machine. This is accomplished in the clause counter map inference engine by adding a cycle marker entry to the queue at the end of each cycle. When the cycle marker is encountered at the head of the queue, it marks the end of the current transient cycle, and thereafter new input events will be added to the queue and the new cycle marker added behind them. In a single process implementation of the clause counter map inference engine, input events would be collected at the end of each transient cycle. In a producer process/consumer process implementation, an interrupt handler would post events either to a shared buffer or as messages within a multi tasking environment. The queue servicing consumer process would also be enabled to accept new event messages at the end of each transient cycle.

In the implementation of the clause counter map inference engine as described, initialization values should be defined within the clause counter map, use lists, and value arrays or tables to be loaded into the memory of a computing system. The usual "all variables unknown" loading procedure will contain the lengths of 0 clauses in the "# not yes" and "# not no" fields of the clause counter map. Inference processing may be suspended within the queue stack cleared by saving the clause counter map representation along with the value tables of the inference engine. The use list will never be altered during processing, and reloading of the saved items will thereafter allow inferencing to be resumed. If the queue stack is not empty at suspension time, it also must be saved and restored to resume inferencing.

It should be recognized that the clause counter map inference engine process is inherently event-chaining, where an event is one change in the input. When an event occurs, the interpreter of the inference engine follows the use list of the corresponding input variable, updating clause counts along the way. As each pair of counts is adjusted, the resulting counts are tested for changes in clause values accordingly. Such adjustment and testing procedures can be data driven and very fast, and scanning of the entire system is not necessary. Adjustment of counts terminates when a clause does not change value as a result, or an assignment connector is encountered. Although the operation of the clause counter map inference engine does not require scanning of the entire system between input updates, it is normally desirable to order the processing of input and state change events as if a scan is occurring. Such operation maintains the desired emulation of a synchronous machine as previously described. The result of this operation is a free running process which preserves scan cycle implementation without a fixed scan.

It is also possible in the implementation of a clause counter map inference engine for more than one event involving the same logical function to be present in the event queue stack at the same time and within the same cycle. Such occurrence happens when the combined use list of a cycle's events contain a clause more than once. This situation appears in the queue as two or more events for the same variable on the same side of the cycle marker. Unnecessary traversal of the function's use list can be avoided in such cases, if the prior presence of an unprocessed change event can be detected when a second event occurs, and the second event is transitively combined with the first event. For example, a change from UNKNOWN to NO for a logical function can be combined with a change from NO to YES, such that only an UNKNOWN to YES event is processed down a use list. When the prior event is reversed, as always happens when the system variables are fully known, all use list traversal can be avoided, and the first event can be effectively removed from the queue. For correct resolution of event transients, transitive combining of a variables event must be restricted to events within the same transient cycle as indicated by a cycle marker. For implementation of transitive combinations, an array of hazard pointers may be reserved in memory, one for each logical function within the system. Within a cycle, when a logical function event is placed on the queue, its corresponding hazard pointer is set to point to the queue entry. The queue may then be implemented in such a way that the head and tail hazard pointers change, but the queue entries do not change position. Such requirements may be met by the commonly used methods of link lists or circulating pointers on an array. Before adding another logical function event entry to the queue, the corresponding hazard pointer is checked to see if a prior entry has been made. If such prior entry has indeed been made, the pointer is followed and transitive combination is carried out. A canceled event can be left on the queue to avoid having to adjust hazard pointers if desired. When a cycle marker is thereafter encountered, all hazard pointers are reset, thereby preventing transitive combination across transient cycle boundaries.

The hazard pointer array may not be necessary in a particular model, especially in large systems with many state variables. Static hazards may also be infrequent or non-existent in a particular model, and the hazard pointer array may therefore be unnecessary. As an option, the ability to toggle static hazard on-line processing off for a particular model would enable a model to be compiled with a status hazard array, wherein the on-line system could thereafter be tested with static hazard processing on and off. If significant benefits were not observable between implementation of the system with and without static hazard processing, a customizing toggle switch could be set in the on-line model so that memory space for the static hazard array is not reserved in subsequent model loading and static hazard processing remains off. Other queue operations would be unaffected in operation of the on-line control system with or without static hazard processing.

The clause counter map inference engine is performed by an event chaining operation, wherein upon the occurrence of an event, all prior event contributions to the clause count of every relevant clause has been recorded, and no clause count is tested without an accompanying action. Such action includes the adjustment of the clause counts which is a direct consequence of the event being processed without unnecessary scanning, and such that no other polling occurs. Thus, every clause count adjustment, rule firing, and queue access performed by the clause counter map inference engine is necessary, and each is accomplished without search. Each of the clause counter map inference engine actions is necessary for the sake of accurate response to later events. Clauses are conditioned by updating of the counts to fire correctly when the decisive event occurs. Full clause updating permits a reversal of inferences, wherein for example, a change from a NO to an UNKNOWN event propagates exactly like an UNKNOWN to NO event in the inferencing process. The ability in the clause counter map inference engine of permitting reversals of inferences is a universal requirement in PLC control applications. On the other hand, inference mechanisms in artificial intelligence may be "monotonic", and do not permit reversals of inferences. Optimum operation of the clause counter map inference engine may thus be performed in non-monotonic control applications, with slightly less than optimum performance in such monotonic systems.

It is also a feature of the clause counter map inference engine that the method can implement models defined in a variety of design languages. For example, on-line relay ladder logic models, which predominate as the design language in the United States, may be translated into the clause counter map of the present invention. The translation of the logical elements of a relay ladder diagram allows easy implementation, while eliminating the need to traverse the ladder equivalence as required of an on-line relay ladder logic model.

It is also mentioned that various peripheral equipment such as PLC timers, counters and numerical processors are integrated with the clause counter map inference engine similar to such association with other current logic processing systems. Timers are regarded as external to the clause counter map machine, as a destination for "time" and "reset" outputs and a source of "timed out" inputs. Counters and other numerical processors are activated and operated by output variables, and require means of generating Boolean input to the logic network representing "counted out" conditions and results of relational operators such as "equal to", "greater than", "less than" or the like.

The clause counter map inference engine of the invention represents an on-line implementation method which has been shown to have optimal properties with respect to time of execution in PLC and artificial intelligence applications. The method provides an event chaining implementation method which eliminates software polling by the investment of memory to maintain a complete state of the control system. The clause counter map inference engine methodology supports all contemporary PLC design languages, via translation to clause counter map data structures and on-line execution of the data structures by an interpreting algorithm. As inferencing processing time depends only on the extent of the implications of inputs, the system is well suited to real-time systems. The servicing of inputs and outputs may be defined in a process separate from emptying of a queue stack, such that widely varying inference demands may be accommodated within a regular service cycle. Less powerful microprocessors may be used, or more frequent input and output servicing may be provided with the same microprocessor. The clause counter map inference engine provides a flexible and efficient method of implementing logical control. Although the invention has been described with reference to specific examples and preferred embodiments, it should be understood that various modifications may be made and would be apparent to those skilled in the art. Therefore, the invention is only to be limited by the appended claims.

What is claimed is:

1. A clause counter map inference engine for implementation of logical control systems, comprising:

a map of logical rules defining a logical control system stored in computer memory, wherein said map represents a series of rules, each logical rule comprising a rule type code and main clause record, and at least one additional clause record, wherein adjacency of said clause records in said map indicates that the clause further from said rule type code is a member of the clause nearer said rule type code, except where said clause records are separated by a skip marker, wherein a set of clauses separated by skip markers are represented to be members of the clause adjacent to the said set of clauses in the direction of said rule type code, said clause records comprising a clause connective denoting the logical nature of the clause, and at least one count field representing the number of members of the clause that are currently in a logical state determined by the conventions of said map, said interference engine including a use list associated with at least one input or logical rule of said logical control system, which identifies in said map within computer memory said clauses containing said input or logical rule, and indicates the application of a logical negation to the use of said input or logical rule within said clause in which it is contained, said inference engine including storage means to store the current logical value of each input or logical rule of the application, said interference engine associating each logical rule of said map with said current logical value by means of an identifying index number, said index number either being placed in said map adjacent to the rule type code, or a copy of said index number being present within a use list entry in the use lists associated with other of said logical rules, such entry representing the use of a rule in said other logical rules, an inferencing algorithm adapted to compute all changes in said clause counts and said associated rule values resulting from a change of an input or logical rule value, said algorithm being directed to each effected clause by means of said use list associated with said changed input or rule value, and said algorithm using the old value and new value of said changed input or rule value to adjust said clause counts, and said algorithm determining whether said adjusted value of said clause counts represents a change of clause value, and if said change of clause value is indicated, said algorithm then moving to said clause record of said clause containing said adjusted clause, and said algorithm continuing in the described manner until a containing clause value is not affected or until the rule type code is reached within said map, and said algorithm determining by means of said index number, and said current value, if said logical rule represented by said map is changed, and said algorithm adapted to record each such change on a list of changes for processing and computation of changes in said clause counts and said associated rule values, said list of changes comprising entries including an old logical value, a new logical value, and said identifying index number of said logical rule, and said algorithm processing each of said input changes and resulting changes in said logical rules so as to produce output signals representative of adjustments made to clauses within said map.

2. The clause counter map inference engine of claim 1, wherein, said rule type codes associated with said main clause and said at least one clause within said map are provided as a symbol representing a logical implication on the rule value, wherein permitted meanings of said rule type codes representing the rule types including "IF", wherein a true main cause implies a true rule value, while a false main clause makes no implication; and "NOTIF", wherein a true main clause implies a false rule value; and "IFF", wherein a true main clause implies a true rule value and a false main clause implies a false rule value.

3. The clause counter map inference engine of claim 1, wherein, said clause connectives forming a part of said clauses include the Boolean binary operators "AND", "OR", "NAND", "NOR", and "EXOR", as conventionally defined.

4. The clause counter map inference engine of claim 1, wherein, said logical rules are 2-valued Boolean functions, and said inputs to said inference engine are 2-valued input variables, each 2-valued clause record having one count associated therewith representing the clause state in 2-valued Boolean logic.

5. The clause counter map inference engine of claim 1, wherein said logical rules are 3-valued Boolean functions, and said inputs to said inference engine are 3-valued input variables, each 3-valued clause record having two counts associated therewith representing the clause states in 3-valued Boolean logic.

6. The clause counter map inference engine of claim 1, wherein, said inferencing algorithm uses a queue, or first-in, first-out (FIFO) organization for said list of changes, processing the oldest change entries first, and said inferencing algorithm places a uniquely coded entry on the queue as a marker to represent the end of a cycle, and said inferencing algorithm, upon encountering said cycle marker entry as output of the queue, then records new input changes on the queue, immediately followed by a new cycle marker, to thereby affect synchronous operation of an on-line control model.

7. The clause counter map inference engine of claim 6, wherein, said inference engine also includes a pointer into said queue corresponding to each logical rule, and said inference algorithm includes the examination of this pointer before adding an entry to said queue for a change in the corresponding logical rule, whereupon said pointer being set, said algorithm uses said pointer to locate a prior recorded queue entry and transitively combines the new change with the previous change, leaving any net change in the queue, or removing any canceled change from the queue and clearing said pointer, or if said examined pointer is not set, but contains a null value meaning that no previous change of a corresponding logical rule is currently on the queue, then said algorithm sets the pointer to the location of the new queue entry, said algorithm also clearing all said pointer entries when a cycle marker is encountered, and said inference engine maintains the queue of changes in such a way that locations of queue entries in memory does not change, and said pointers remain accurate, as the queue advances.

8. The clause counter map inference engine of claim 1, wherein, said inference engine further includes a table associated with each of said clause records, wherein said inference engine can apply a current change code and said clause count to look up both a modified count to be stored in said clause record, and a new change code to be applied to said containing clause or rule value, and a table wherein said inference engine can apply said current change code obtained from said clause record to look up said rule change code.

* * * * *